(12) United States Patent
Yamada

(10) Patent No.: US 6,674,715 B1
(45) Date of Patent: Jan. 6, 2004

(54) SWITCHING OF REDUNDANT COMMUNICATION CHANNELS IN ATM SWITCHING SYSTEM

(75) Inventor: Kiyoshi Yamada, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/134,343

(22) Filed: Aug. 14, 1998

(30) Foreign Application Priority Data

Mar. 13, 1998 (JP) .......................................... 10-063738

(51) Int. Cl.$^7$ .............................. H04J 1/16; H04J 3/17; H04L 12/28
(52) U.S. Cl. ..................... 370/220; 370/395.1; 370/434
(58) Field of Search ................................. 370/216–228, 370/236.2, 236.1, 235.1, 242, 244, 395.1, 396, 395.21, 395.32, 395.43, 434

(56) References Cited

U.S. PATENT DOCUMENTS

| | | | |
|---|---|---|---|
| 5,671,213 A | * | 9/1997 | Kurano ........................ 370/218 |
| 5,903,544 A | * | 5/1999 | Sakamoto et al. ........... 370/218 |
| 6,031,838 A | * | 2/2000 | Okabe et al. ............. 370/395.6 |
| 6,075,767 A | * | 6/2000 | Sakamoto et al. ........... 370/228 |

FOREIGN PATENT DOCUMENTS

JP  5-160851  6/1993

* cited by examiner

Primary Examiner—Chau Nguyen
Assistant Examiner—Andy Lee
(74) Attorney, Agent, or Firm—Katten Muchin Zavis Rosenman

(57) ABSTRACT

An ATM switching system comprises a redundant communication; system consisting of act-system and standby-system communication channels. Cells are sent through both the communication channels. A switch element is provided for performing system switching from the act-system communication channel to the standby-system communication channel in response to a request-to-switch. The switch element is connected with a line concentrator. The ATM switching system further comprises reading and controlling elements functionally realized installed software, for example. The reading element reads, when receiving the request-to switch, a number of the cell passing the line concentrator channel by channel. And the controlling element controls a switching operation of the switch element based on the read numbers. By way of example, the controlling element is formed such that it calculates a difference between the read numbers, allows the switch element to perform the switching operation when the difference is less than a specified value, and prohibits the switch element from the switching operation when the difference is not less than the specified value. By this, such service interruption as cell losses during the redundant system switching can be avoided, providing a stable and reliable cell communication.

4 Claims, 11 Drawing Sheets

SWITCHING OF REDUNDANT COMMUNICATION CHANNELS IN ATM SWITCHING SYSTEM

BACKGROUND OF THE INVENTION

The present invention relates to an ATM (asynchronous transfer mode) switching system that is a backbone member in communication across a multimedia network, and particularly, to improvement in switching performance between an act-system and standby-system communication channels placed as a redundant system in the ATM switching system.

In general, to make sure that communication is securely performed, an ATM has a duplex (redundant) system, which consists of, for example, an act and standby communication systems (channels) including switches for switching the channels. Cells are sent to both the act and standby systems, and cells passing through the act system are handled as effective ones in a normal state. However, when something accidental occasions occur in the act system, the switches are switched to the standby system.

Although cells are sent synchronously with clocks in both the act and standby systems, the cells may slightly shifted from each other in timing. This shift may result in a partial loss of the cells (i.e., cell losses) during the switching operation of the switches. If the receiver is under reception of image data, for example, the cell losses result in influences such as skips or disturbances of the images.

Thus, it is required to avoid such cell losses (referred to as "non momentary interruption performance") during the switching operation of the switches.

In many conventional ATM switching systems, the non momentary interruption performance for cell communication during the switching is taken for granted, in addition to a precondition that a normal cell communication is secured even after the switching.

However, in such conventional ATM switching systems, since an ultra high speed transfer of fixed length cells is carried out, subtle disturbances in clocks supplied to each unit composing the switch systems cause various drawbacks such as cell losses or stops in a stream of cells (cell stops). Large numbers of cell losses or cell stops responding to the switching has been on the rise, which may have been resulted in interruptions of ATM service.

The present invention is realized to overcome the above drawbacks. An object of the present invention is to provide an ATM switching system capable of performing a smooth and stable switching between an act system and standby system communication channels configured therein, without causing such problems as cell losses.

SUMMARY OF THE INVENTION

In order to accomplish the above object, an ATM switching system of the present invention is constructed as follows. The ATM switching system comprises a redundant communication system consisting of an act-system and standby-system communication channels, a cell being sent through both the communication channels, and a switch element for performing system switching from the act-system communication channel to the standby-system communication channel in response to a request-to-switch, said switch element connecting with a line concentrator. Normally, cells are sent through the act-system communication channel to a destination to be sent. In this state, if a request-to-switch is generated due to the fact that abnormalities or the like occur in the act-system communication channel, the path is switched from the act-system communication channel to that of the standby-system by the switch element. The switching permits cells which pass the standby-system communication channel to be sent to the destination.

In the ATM switching system, an aspect of the present invention is that it has an element for reading, when receiving the request-to-switch, a number of the cell which passes the line concentrator for each of the act-system and standby-system communication channels, and an element for controlling a switching operation of the switch element based on the read numbers of the passing cell for both the communication channels.

Preferably, the controlling element comprises an element for calculating a difference between the read number of the passing cell in the act-system communication channel and the read number of the passing cell in the standby-system communication channel, an element for allowing the switch element to perform the switching operation when the difference is less than a specified value, and an element for prohibiting the switch element from the switching operation when the difference is not less than the specified value.

It is preferred that the switching controlling element comprises an element for notifying an administrator of the fact that the system switching has not been accomplished when the switching has not been allowed.

Moreover, the reading element is possible to be constructed such that the number of passing cells for each of the act-system and standby-system communication channels is read specified times, preferably, specified times at intervals. Compared to one time of the reading, objects to be determined increase in number, making it more reliable the switching determination by the controlling element.

Moreover, for each communication channels consisting of a plurality of channels, it is preferred that the switching determination be applied to all the channels and those determination results be reflected in its final switching control.

To be specific, since an ATM switching system has a plurality of information highways for each of the act-system and standby-system communication channels, preferred is that the passing cell number is measured (read) for each information highway to determine the final switching, thus increasing reliability in the switching.

Instead of reading the cell number formation highway, as an communication channel, the reading element may be formed into a construction having an element reading, preferably, specified times at intervals, the number of the passing cell every logic path (VPI/VCI) of the line concentrator for each of the act-system and standby-system communication channels.

In addition, another aspect of the above ATM switching system is that it comprises an element for sending, when receiving the request-to-switch, a specified cell from the first line concentrator placed in the standby-system communication channel to the standby-system communication channel of the second line concentrator, at least one time, preferably, specified times at intervals, and an element for controlling a switching operation of the switch element by not only allowing the switching operation when a number of the received specified cell in the standby-system communication channel of the second line concentrator and a number of the sent specified cell equal to each other but also prohibiting the switching operation when both the numbers differ from each other In this construction, it is also preferred that the switching controlling element comprises an element for notifying an administrator of the fact that the system switching has not been accomplished for avoiding cell losses when the switching has not been allowed.

By way of example, the specified cell sending element includes an element storing a checking data into the specified cell when sending the specified cell, and said switching controlling element include an element not only allowing the switching operation when the checking data in the specified cell received at the standby-system communication channel of the second line concentrator agree with an original data concerning the checking data but also prohibiting the switching operation when the checking data differ from the original data. This gives a steady switching manner to the switch element. A check sum value stored in a cell payload part of the specified cell is one example of the checking data.

In the invention, for switching from the act system to the standby system, the numbers of cells passing the individual act and standby systems are read for searching a condition in which both the cell numbers are as close as possible to each other. When such condition is realized, the switching is performed, avoiding occurrence of cell losses as much as possible.

Further, by way of example, the switching from the act system to the standby system is done only when a specified cell is sent from the first line concentrator in the standby system to the standby system of the second line concentrator, and the number of received specified cells in the standby system of the second line concentrator agrees with its sending line concentrator and a check sum value of a cell payload part of the specified cell agrees with its original data, preventing cell losses as well.

DESCRIPTION OF THE PREFERRED EMBODIMENTS

Referring to the accompanying the drawings, preferred embodiments will now be described.

First Embodiment

Figure 1:
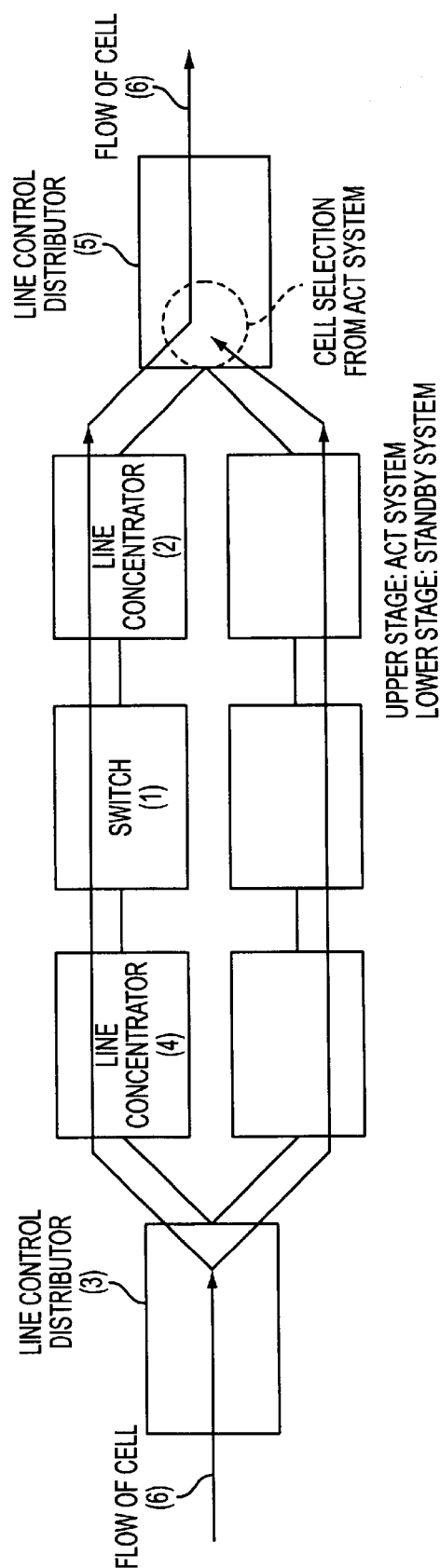
FIG. 1 schematically shows a switching apparatus adopted by an ATM switching system according to a first embodiment of the present invention.

First, the entire configuration of a switching apparatus according to a first embodiment of the present invention will be described. FIG. 1 shows one example of the switching system of an ATM (Asynchronous Transfer Mode) switching system, in which there are provided a switch 1, line concentrators 2 and 4, and line control distributors 3 and 5. The line concentrators 4, switches 1, and line control distributors 2 are made duplex such that the upper stage in FIG. 2 accomplishes an act system communication channel (merely, referred to as act system), while the lower stage therein does a standby system communication channel (merely, referred to as standby system). A cell flows as shown by arrows 6.

Normally, cells are received by a line control distributor 3 placed at one side of the switching apparatus, and then sent in parallel to both of the act and standby systems of the line concentrator 4 placed at the other side. In each communication channel, the output cells from the line concentrator 4 are transferred through a switch 1 to another line concentrator 2 placed in the one (for example, receiver) side of the ATM switching system. Cells from each line concentrator 2 are transferred to a one-side line control distributor 5, wherein the cells which have been passed through only the act system are selected and sent to the one-side (for example, receiver's) circuit. Identification information indicative of being an act system is added to cells passing the act system, while identification indicative of being a standby system are added to cells passing the standby system, which permits a receiver-side line concentrator 5 to make reference to this identification information to select cells from only the act system.

<Position of Passing-cell Counter>

The position to be installed of a counter for counting the number of passing cells (hereinafter referred to as "passing-cell counter") will be explained using FIG. 2 which shows in a block form the construction of the one-side line concentrator 2. The line concentrator 2 comprises, for each information highway 13, a switch interface unit 11 connected with the switch 1 and another circuit interface unit 12 coupled with both the interface unit 11 and the other-side line control distributor 5. A plurality of information highways 13 are constituted, as shown by references Hw1 to Hwn. The circuit interface unit 12 has four LSIs A, B, E and F, while the switch interface unit 11 has two LSIs C and D. Of these LSI A converts cells received from a plurality of circuits into multiplex cells, LSI B is in charge of transmission of the multiplex cells to the switch interface unit 12, and LSI C converts cells received from a plurality of circuit interface units 12 into multiplex cells and transmit them to the switch 1. On one hand, LSI D distributes cells received from the switch 1 to a corresponding circuit interface 12, LSI E is in charge of reception of cells sent from the switch interface unit 11, and LSI F is responsible for transmission of cells for a corresponding circuit. The present embodiment provides a construction which counts the number of passing cells, every highway 13 (Hw1 to Hwn), in each of the act system and standby systems and mutually compares the counted numbers for the two systems.

Figure 2:
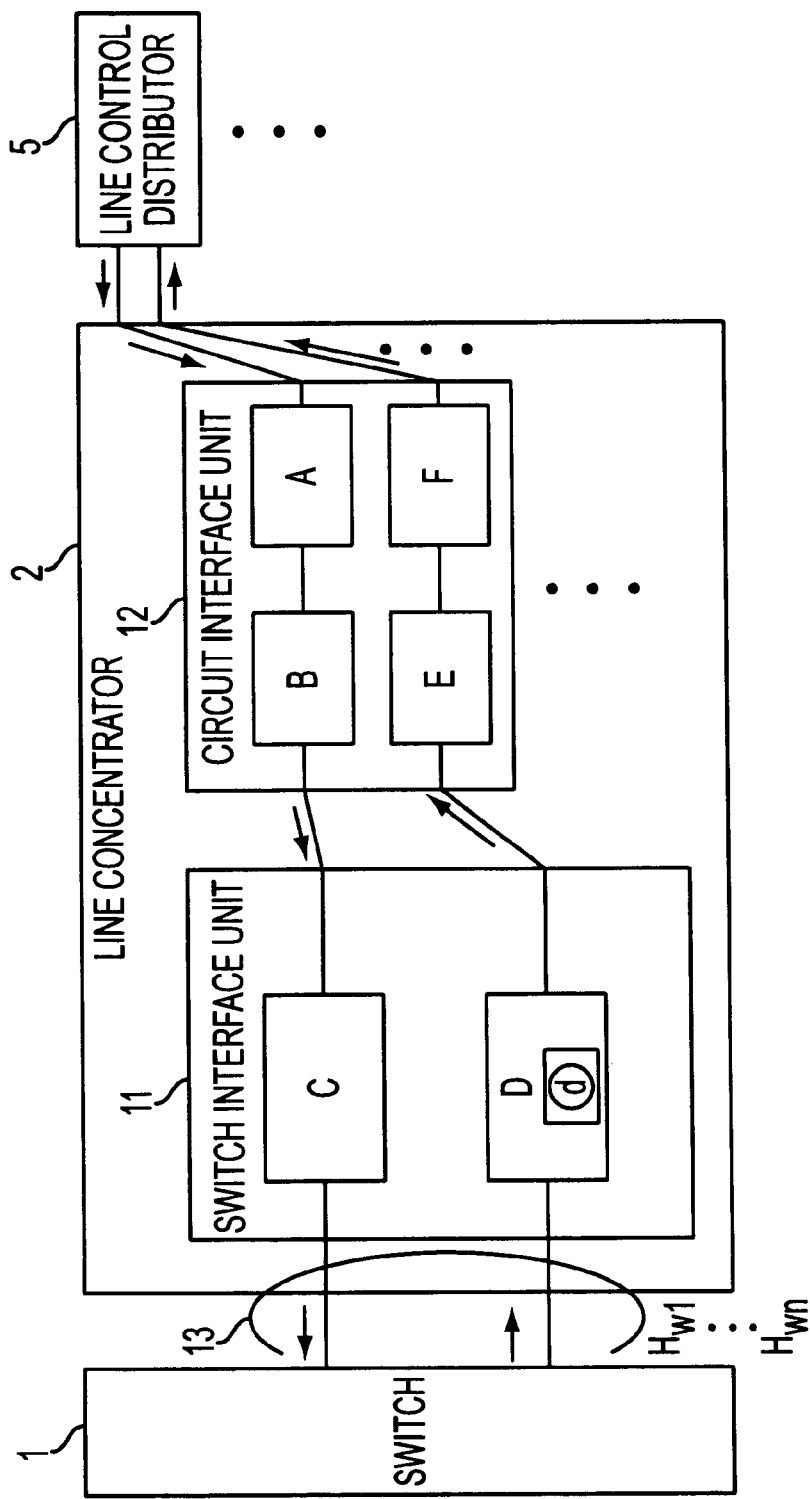
FIG. 2 is a block diagram showing the construction of a one-side line concentrator.
Figure 3:
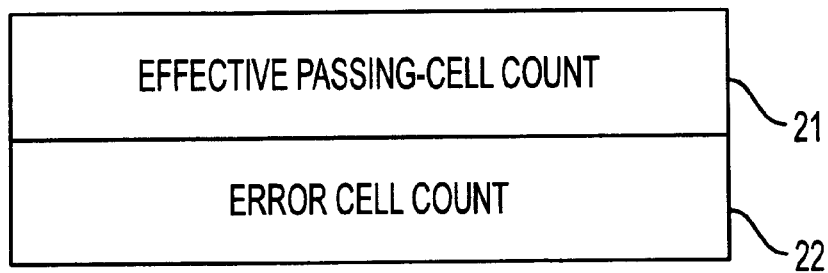
FIG. 3 illustrates the format of a passing-cell counter.

As shown in FIG. 2, a passing-cell counter "d" is incorporated in LSI D. The passing-cell counter "d" has a format illustrated in FIG. 3, comprising an effective passing-cell count 21 for counting the number of passing cells and an error cell count 22 for counting the number of cells which could not passed. In cases bit errors or the like occur in cells, the cells are counted as error cells.

<Switching Means>

In this embodiment, functional means are provided by software which include reading means reading the number of passing cells, which is counted by the counter "d," for each of the act system and standby systems; and controlling means which calculates a difference in the numbers of passing cells for both the channels, and allows the system switching if the difference is less than a specified value, while prohibiting the system switching if the difference is not less than the specified value (i.e., equal to the specified value or more than its value). As an execution condition for system switching in the switches, the system switching is determined.

<Specific Example>

Figure 4:
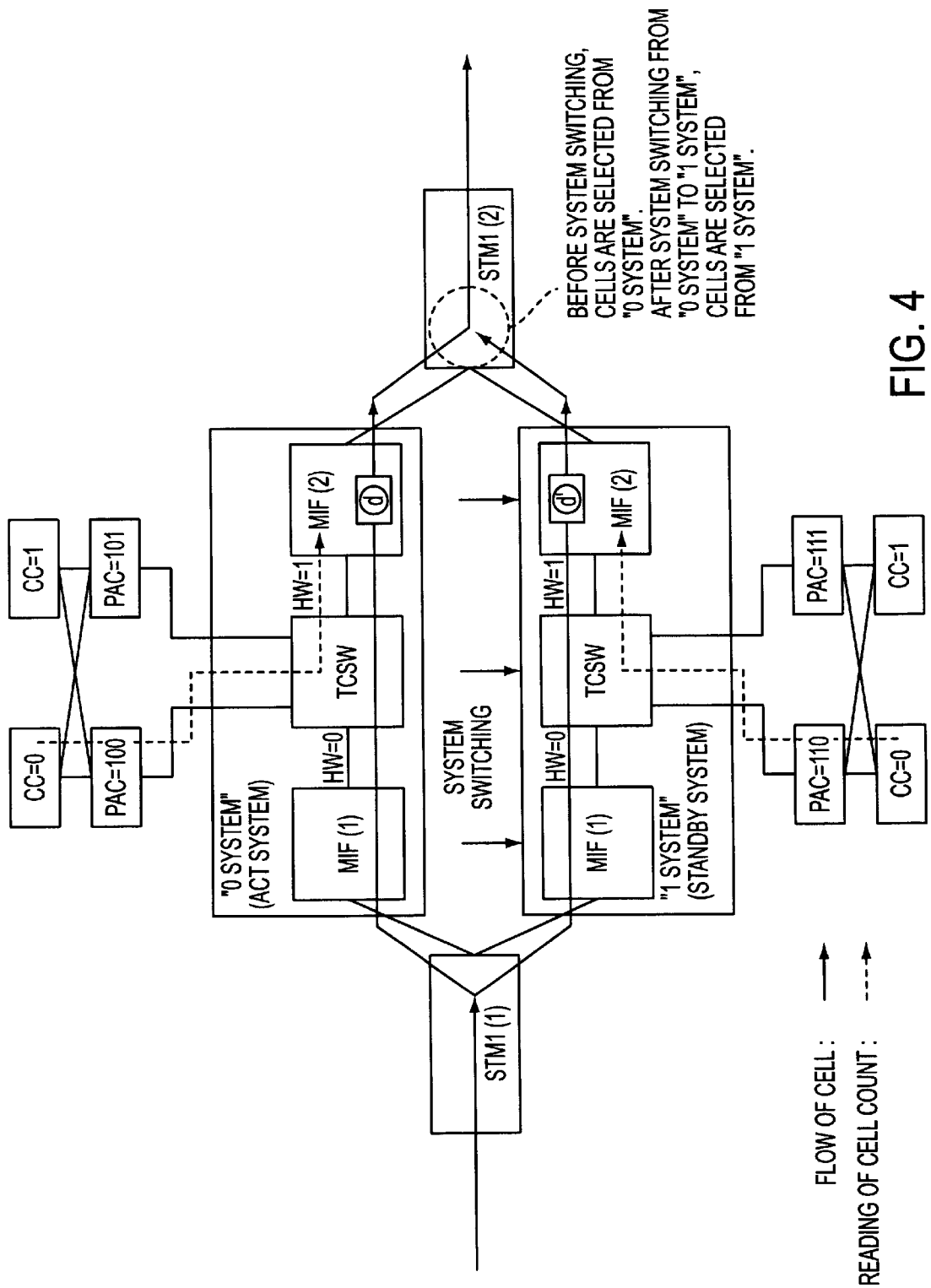
FIG. 4 a block diagram showing as a specific example a regularly-switched switching apparatus according to the first embodiment.

A more specific construction for regular switching is shown in FIG. 4.

A regular switching apparatus, which can be applied to an ATM switching system, shown in FIG. 4 comprises a sender-side line control distributor STM1 (1) and a receiver-side line control distributor STM1 (2). Between them, a line concentrator MIF (1), a switch TCSW and another line concentrator MIF (2) are inserted in series for each of duplex act and standby systems, or "0 system" and "1-system." The line concentrators MIF (1) and (2) are coupled with switch HW=0 and HW=1, respectively.

CC=0 and CC=1 in FIG. 4 denote duplex processors in the ATM switching system. For the sake of simplification, FIG. 4 shows only the two processors CC=0 and CC=1 for each system, which are the same processor in construction. Still provided in FIG. 4 are PAC=100, 110, 101 and 111 are units and individually placed for performing processor-to-processor communication between CCs and TCSW or MIF. Commands, such as cell count reading, are sent from software installed into the processors CCs to hardware elements through PACs. Two MIFs (2) inserted in the act system and the standby system comprises passing-cell counters "d" and "d'", respectively.

The software installed in the processors CC=0, 1 functionally realizes reading means measuring the number of cells passing through each of the act and standby systems by using the passing-cell counters; controlling means calculating a difference in the measured cell counts in both the systems, and allowing the system switching of the switches as long as the difference is less than a specified value, but prohibiting the system switching when the difference is not less than specified value; means notifying an administrator of an abnormal state that the system switching has not been executed when the system switching was not allowed.

The system switching by TCSW is scheduled to be executed regularly, normally, once a week. In response to the regular system switching, MIF (1) and MIF (2) are also individually switched to their standby systems. Prior to the regular switching, the counts are read from the passing-cell counters "d" and "d'" in MIFs (2) (refer to dotted line arrows in FIG. 4), a difference in both the read counts is calculated, and the system switching is allowed only when the calculated difference is less than a specified value (for example 10 cells). Additionally, a case that cells have not passed at all can satisfy the condition of $|d-d'|=0<10$, thereby the system switching being allowed.

Figure 5:
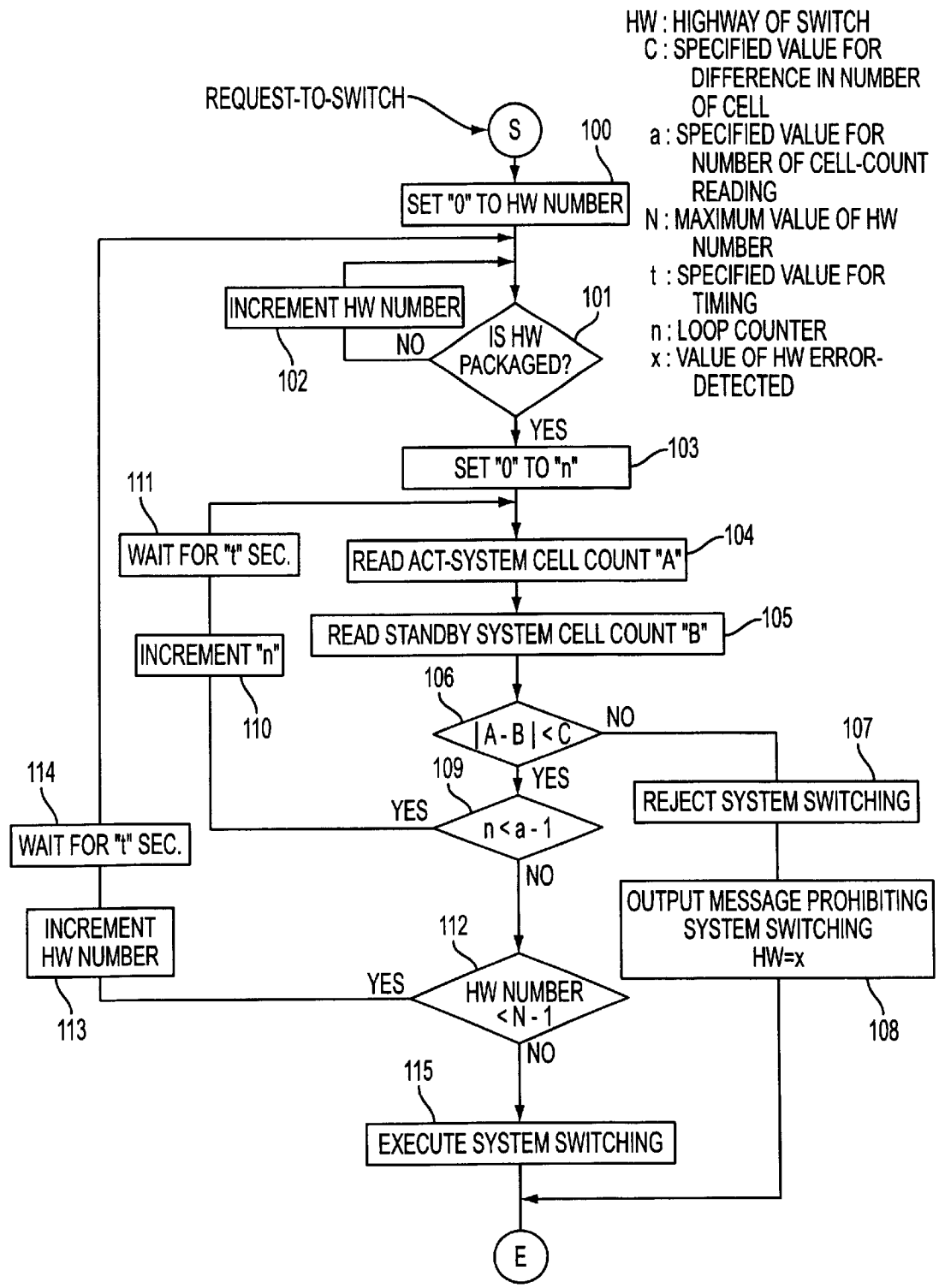
FIG. 5 is a flowchart executed for the system switching in the first embodiment.

FIG. 5 shows a series of processes according to the software. Every time when a regular request-to-switch for the switches is received, the routine shown in FIG. 5 is executed repeatedly.

First, at Step 100, a value "0" is set in a highway number. Then it is determined whether or not a highway corresponding to the highway number is packaged (Step 101). In the case that the corresponding highway is not packaged, the highway number is incremented (Step 102), returning to the execution of the process at Step 101. When it is determined at Step 101 that the corresponding highway is packaged, the processing proceeds to Step 103, where a loop counter "n" is set to 0 (zero) for the initialization. Then, the count "A" of the act-system cell counter is read (Step 104), and the count "B" of the standby-system cell counter is read (Step 105).

Then, at Step 106, a difference (absolute value) between the numbers "A" and "B" of cells in the act and standby systems is calculated, and it is determined whether or not the difference is less than a specified value "C" (=arbitrarily selected value) Needless to say, the most desirable condition is A–B=0, that is, there is no difference. However, since presence of slight differences between the counts "A" and "B" are practically acceptable and the determination using the specified value "C" as a distinguishing criterion is still effective.

When it is determined that the absolute difference between the counts "A" and "B" is equal to the specified value "C" or more than its value, the processing proceeds to Step 107, where the request-to-switch for the systems is rejected. Then the highway number x error-detected is output in the form of HW=x representing a message that prohibits the system switching (Step 108), the routine being terminated.

In cases where, at Step 106, it is determined that the absolute difference between "A" and "B" is less than the specified value "C," the processing is passed to Step 109 where it is determined whether the count of the loop counter "n" is less than a specified value "a–1" assigned as a threshold for the cell-count-reading number. When the determination is that the count of the counter "n" is less than "a–1", "n" is incremented at Step 110, and the processing waits for "t seconds" at Step 111 to return to Step 104. The determination for inquiring the system switching through Step 106 is executed specified times until the condition of n="a–1" is satisfied at Step 109. When the condition is met, the processing goes onto Step 112.

At step 112, determined is whether or not the highway number is less than a maximum "N–1" assigned to the number. If the highway is less so, the processing is passed to Step 113 for incrementing the highway number, further passed to Step 113 for waiting for "t seconds," and returned to Step 101. According to the above processes, for all the highways, the determination for inquiring the system switching through Step 106 is repeatedly executed specified times until the condition of the highway number =N–1 at Step 112 is satisfied. Once this condition is fulfilled, the process at Step 115 is executed such that the systems are switched, and then the present routine ends.

Second Embodiment

A second embodiment of the present invention will now be explained with reference to FIGS. 6 and 7. A feature of the second embodiment is to count cells every logic path connecting the circuits, instead of counting cells every highway.

Figure 6:
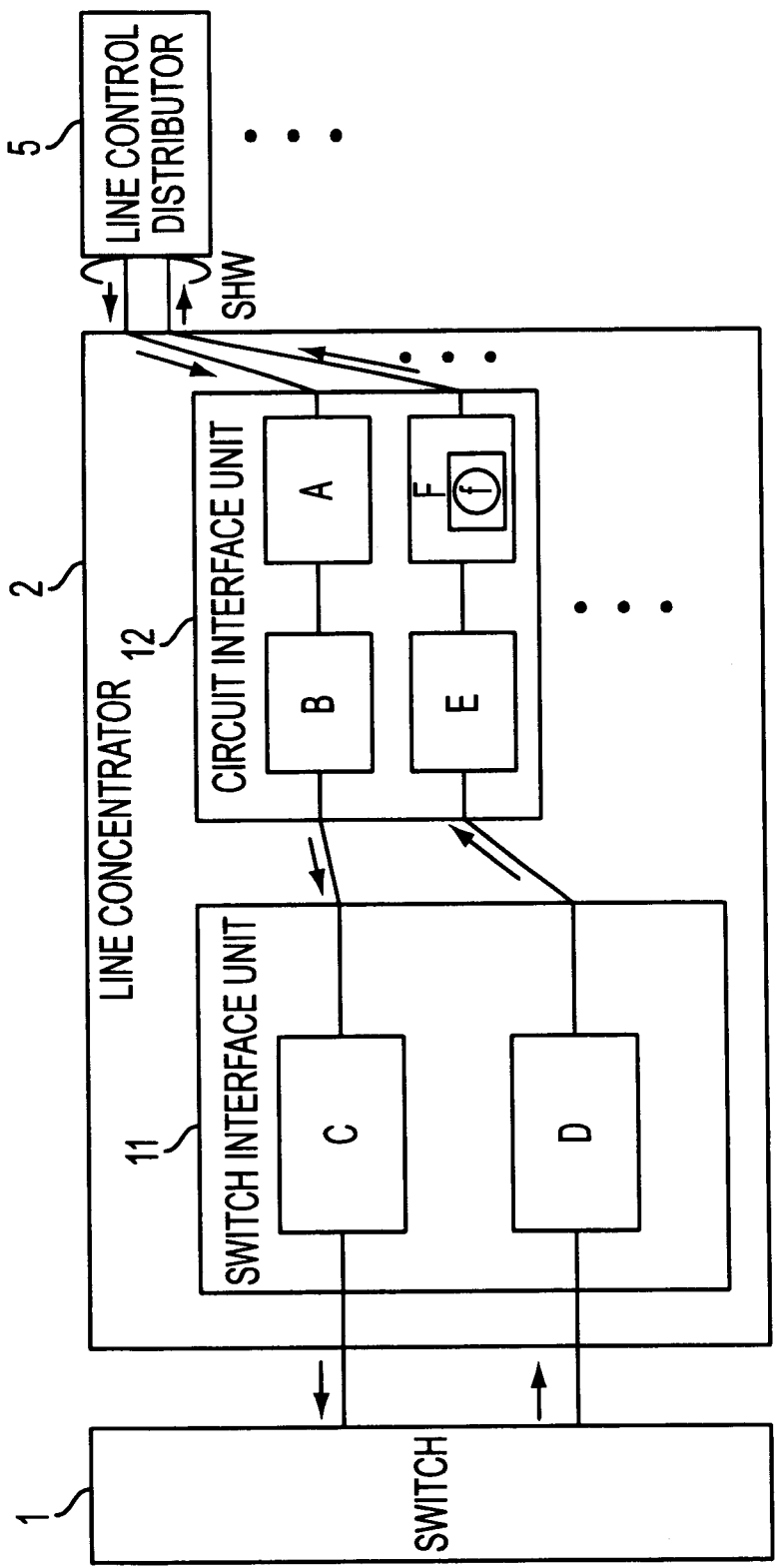
FIG. 6 is a block diagram of a line concentrator according to a second embodiment of the present invention and used for explaining the position of a passing-cell counter.

In order to achieve such counting, the second embodiment provides a line concentrator 2 schematically shown in FIG. 6. The line concentrator 2 comprises, for each information highway 13, a switch interface unit 11 connected with the switch 1 and another circuit interface unit 12 coupled with both the interface unit 11 and the other-side line control distributor 5. A plurality of information highways 13 is constituted, as shown by references Hw1 to Hwn. The circuit interface unit 12 has four LSIs A, B, E and F, while the switch interface unit 11 has two LSIs C and D. Of these LSI A converts cells received from a plurality of circuits into multiplex cells, LSI B is in charge of transmission of the multiplex cells to the switch interface unit 12, and LSI C converts cells received from a plurality of circuit interface units 12 into multiplex cells and transmit them to the switch 1. On one hand, LSI D distributes cells received from the switch 1 to a corresponding circuit interface 12, LSI E is in charge of reception of cells sent from the switch interface unit 11, and LSI F is responsible for transmission of cells for a corresponding circuit. In the figure, a reference 13 denotes information highways (Hw1 to HWn) and a reference 14 denotes a highway SHW1 to SHWn placed at the line control distributor side.

A passing-cell counter "f" is functionally formed in LSI F, as pictorially shown in FIG. 6. The passing-cell counter, which has the same format as that in FIG. 3, counts cells passing through logic paths (VPI/VCI) formed between the line concentrator 2 and the line control distributor 5 for each of the act and standby systems. In this embodiment, software functionally provides means for reading the number of cells passing through the logic paths (VPI/VCI) for each of the act and standby systems, means for evaluating the read numbers of passing cells in terms of the system switching, and means for notifying of an administrator of the fact the system switching was not executed, provided the system switching was not allowed.

Figure 7:
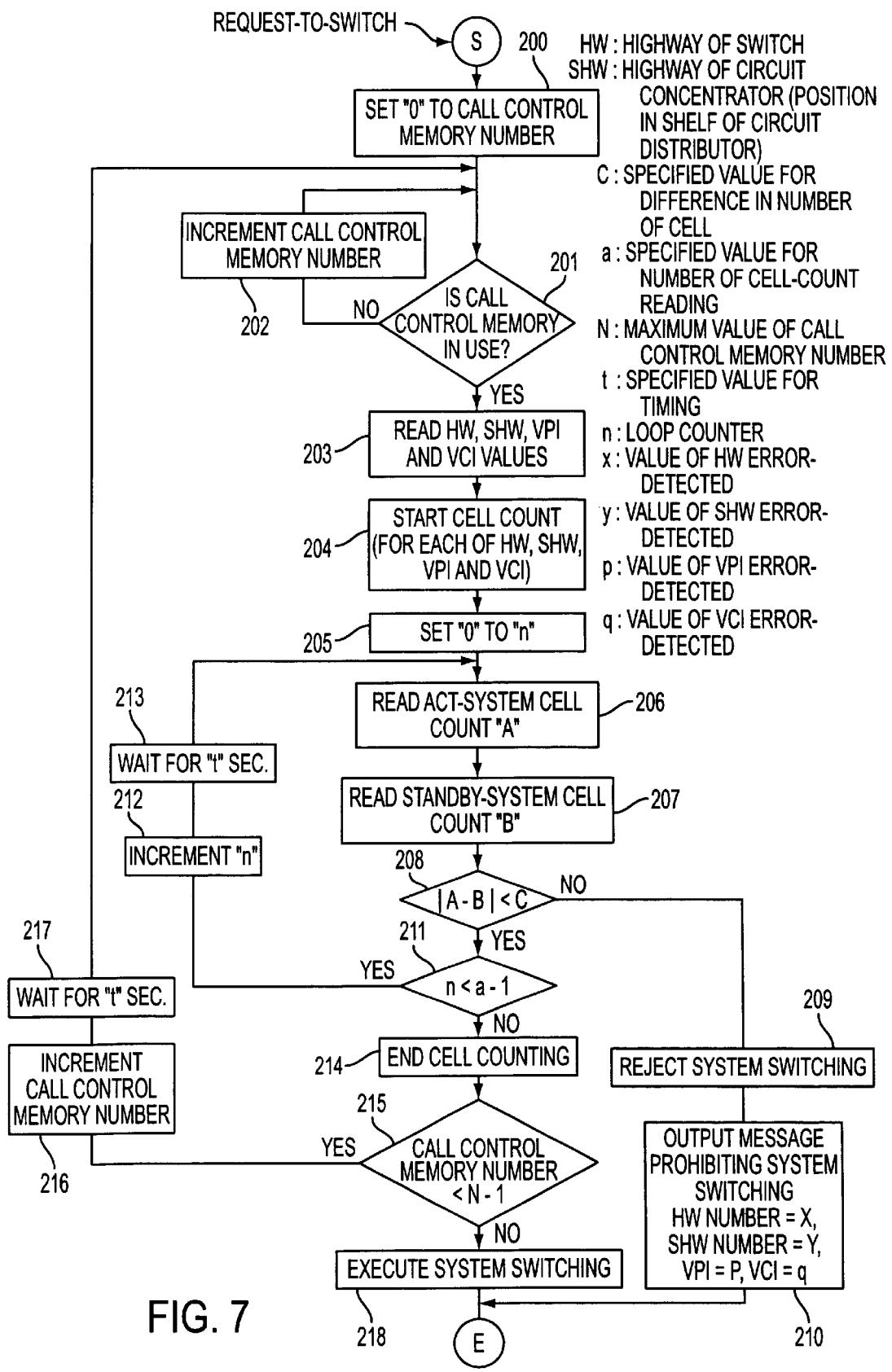
FIG. 7 is a flowchart executed for the system switching in the second embodiment.

FIG. 7 shows a processing routine realized by the software. In response to a regular request-to-switch of the systems, the routine is activated.

First, at Step 200, "0 (zero)" is set to a call controlling memory number that is a memory number specifying the logic path. It is then determined whether or not a call control memory corresponding the number is in use (Step 201). If being not in use, the call control memory number is incremented (Step 202), and the Step 201 is executed again. When the determination that the corresponding call control memory is packaged is made at Step 201, the processing proceeds to Step 203, wherein the highway HW of the switch, the highway SHW of the line concentrator (positions in the shelf of the line control distributor), and the values of VPI and VCI are read, respectively.

VPI is a virtual path identifier (8 bits) having values of 0 to 256, whereas VCI is a virtual channel identifier (16 bits) having values of 32 to 65535, where values 0 to 31 are preserved and unusable for user communication. In some vases, the range of the values are restricted (restricted in bit lengths) depending on networks (frequently, resulting in subscription conditions).

For each of the highways of the switch, the highways of the line concentrator (positions in its shelf), and VPI and VCI, counting cells is then commenced (Step 204).

A loop counter n is then set to "0" at Step 205 (the initialization of the loop counter). Then, the count "A" of the act-system cell counter is read (Step 206), and the count "B" of the standby-system cell counter is read (Step 207).

Then, at Step 208, a difference (absolute value) between the numbers "A" and "B" of cells in the act and standby systems is calculated, and it is determined whether or not the difference is less than a specified value "C" (=arbitrarily selected value). Needless to say, the most desirable condition is A−B=0, that is, there is no difference. However, since presence of slight differences between the counts "A" and "B" are practically acceptable and the determination using the specified value "C" as a distinguishing criterion is still effective.

When it is determined that the absolute difference between the counts "A" and "B" is not less than the specified value "C", the processing proceeds to Step 209, where the request-to-switch for the systems is rejected. Then, output are the error-detected highway number X as being in the form of HW=X, the SHW number=Y VPI=p, and VCI=q representing a message that prohibits the system switching (Step 210), the routine being terminated.

In cases where, at Step 208, it is determined that the absolute difference between "A" and "B" is less than the specified value "C", the processing is passed to Step 211 where it is determined whether the count of the loop counter "n" is less than a specified value "a−1" assigned as a threshold for the cell-count-reading number. When the determination is that the count of the counter "n" is less than "a−1", "n" is incremented at Step 212, and the processing waits for "t seconds" at Step 213, returning to Step 206. The determination for inquiring the system switching through Step 208 is executed specified times until the condition of n="a−1" at Step 211 is satisfied. When the condition is met, the processing goes onto Step 214.

At Step 214, the termination of cell counting is commanded. Due to the fact that LSI counting cells is unable to concurrently count cells for a plurality of identifiers VPI and VCI, it is required that the commands of commencement and termination are sent out for each time when VPI and VCI are changed one from another.

Then, at Step 215, determined is whether or not the call control memory number is less than a maximum "N−1" assigned to the number. If the call control memory number is less so, the processing is passed to Step 216 for incrementing the call control memory number, further passed to Step 217 for waiting for "t seconds," and returned to Step 201. According to the above processes, for all the call control memories (i.e., logic paths), the determination for inquiring the system switching through Step 208 is repeatedly executed by specified times until the condition of the call control memory number =N−1 at Step 218 is satisfied. Once this condition is fulfilled, the process at Step 218 is executed for switching the systems, and then the present routine ends.

The foregoing first and second embodiments have a construction which counts a difference in the numbers of cells passing each of the act and standby systems and compare those counts with each other for realizing the system switching of the redundant communication channels, which therefore makes it possible to prohibit the system switching which might have caused interruption in communication service, thereby continuing the communication service as it has been, even when the difference in the numbers of cells is a certain value or more.

Third Embodiment

A third embodiment of the present invention will now be explained with reference to FIGS. 8 to 11.

An ATM switching system of the third embodiment has means for sending a specified cell and means for controlling switching, both of which are realized in the foregoing ATM switching system. The specified cell sending means is formed to send a specified cell at least one time, preferably specified times at certain intervals, from a standby-system line concentrator 4 to the standby system of another line concentrator 2 when the switches are switched from the act system to the standby system. The switching controlling means is formed such that it allows the switching when the reception number of the specified cell in the standby system of another line concentrator 2 and a check sum value of a payload part of the cell agree with individually their references, while it prohibits the switching if those two values are not in agreement with their references.

Figure 8:
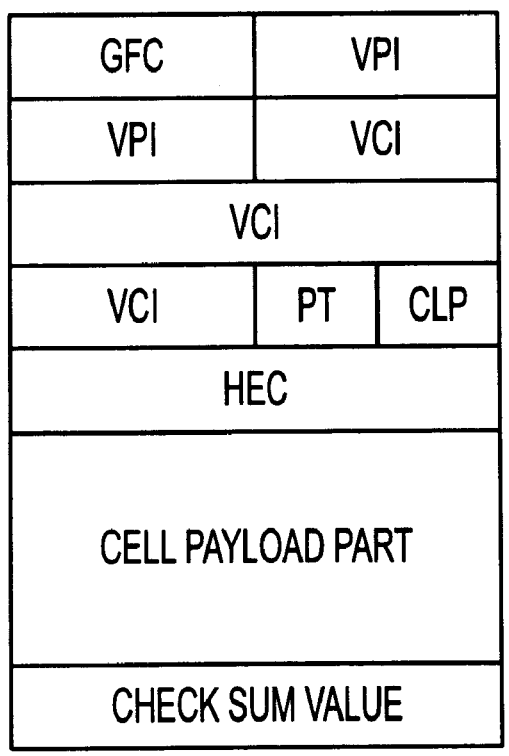
FIG. 8 illustrates the format of a specified cell in a third embodiment of the present invention.
Figure 9:
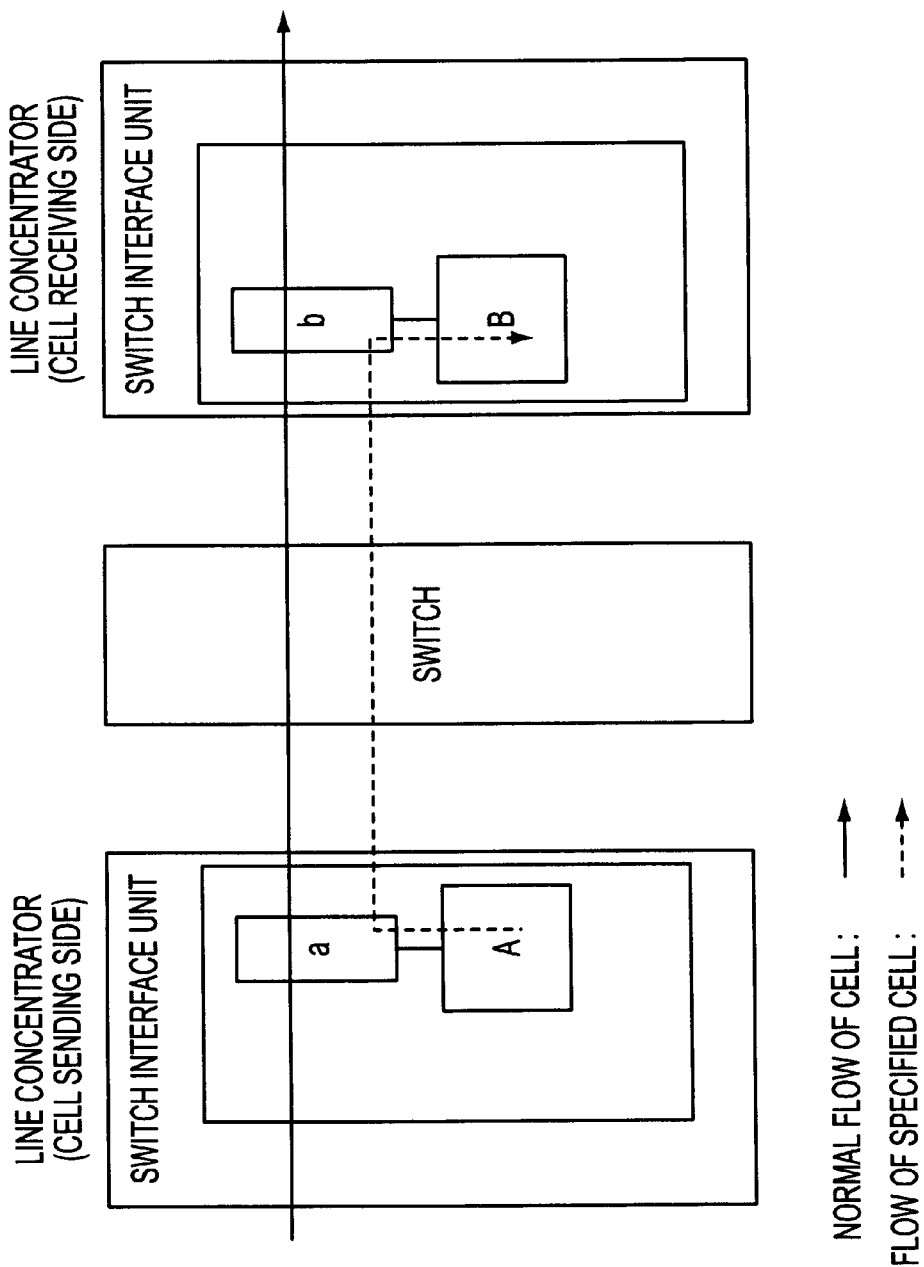
FIG. 9 is a block diagram for explaining the generation and reception of a specified cell.

FIG. 8 represents a format of the specified cell. FIG. 9 represent in block forms a construction concerning the generation and reception of the specified cell, in which a cell generator "A" and a cell sending buffer "a" are incorporated in a switch interface unit of a cell-sending-side line concentrator, whereas a cell receiver "B" and a cell receiving buffer "b" in a switch interface unit of a cell-receiving-side line concentrator. The cell generator "A" is capable of generating a specified cell, computing a check sum value of a payload part to add it to the last byte of the payload of the specified cell (refer to FIG. 9), and send the specified cell via the cell sending buffer "a" at specified timing by specified times. The cell receiver "B" is able to receive and monitor the specified cell via the cell receiving buffer "b" during a specified interval, count the specified cell received, and memorize it. Moreover the cell receiver "B" is capable of computing a check sum value of the received cell, determining whether or not the computed check sum value agrees with the sent one, and counting and memorizing the error number of occurrences of check sum errors.

The present invention applied to the third embodiment has the generator "A" and receiver "B" shown in FIG. 9, which are provided by hardware units, and means for instructing each unit of sending or receiving a specified cell and examining normality in cell communication, which is provided as software function, in addition to a construction that determines the system switching as an execution condition for the system switching of the switches.

Figure 10:
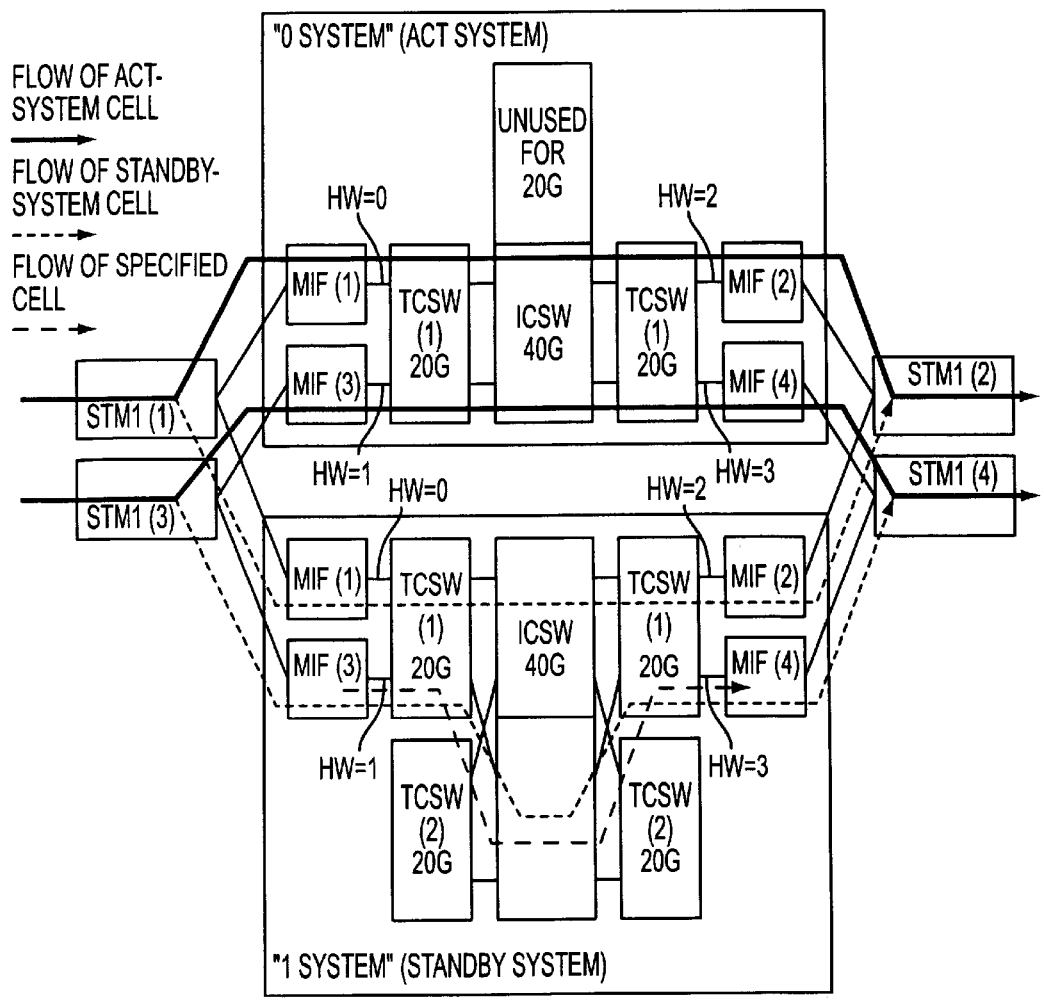
FIG. 10 is a block diagram showing as a specific example a switching apparatus according to the third embodiment.

FIG. 10 shows a more concrete example of the construction wherein the switches are expanded. In FIG. 10, references ISCW, TCSW (1) and TCSW (2) depict switches respectively, references MIF (1), MIF (2), MIF (3) and MIF (4) depict line concentrators respectively, and references STM1 (1), STM1 (2), STM1 (3) and STM1 (4) depict line control distributors respectively.

ICSW, which is a switch having a capacity the double of TCSW, has a capacity of 40G as a standard. "0 system" in the figure corresponds to an act system in which TCSW(1), ICSW, and TCSW (1) are connected to each other in series. A maximum capacity of ICSW is 40G, but in the case of FIG. 10, only up to 20G is used (before expansion).

In contrast, "1 system" shown in FIG. 10 constitutes a standby system wherein TCSW (2) is expanded. As shown in the figure, the connection among TCSW (1), TCSW (2) and ICSW differs from that in the act system. In normal, in this state shown, the system switching to convert the "1 system" into an act system is carried out in response to a command, which will be followed by a similar expansion of the "0 system" to the "1 system." A problem is that, when the system switching is carried out, the expanded cells of the standby system has not yet been verified. As a result, there is a possibility that service interruption such as cell looses and/or cell stops comes about. Therefore, it is necessary to examine normality in cell communication prior to the system switching.

In FIG. 10, a dotted line represents a flow of cells when cells have passed normally, whereas a bold dotted line represents a flow of cells according to the present invention. Provided that the cell communication along the bold dotted line is kept normal, it is determined that the expansion of switches can be carried out without interruption of service, and the systems can be switched.

For an example regarding regular switching of the switches, means for reading (measuring) cell counters by means of software is provided. Alternatively, means for reading (measuring) cell counters by means of hardware may be provided.

Figure 11:
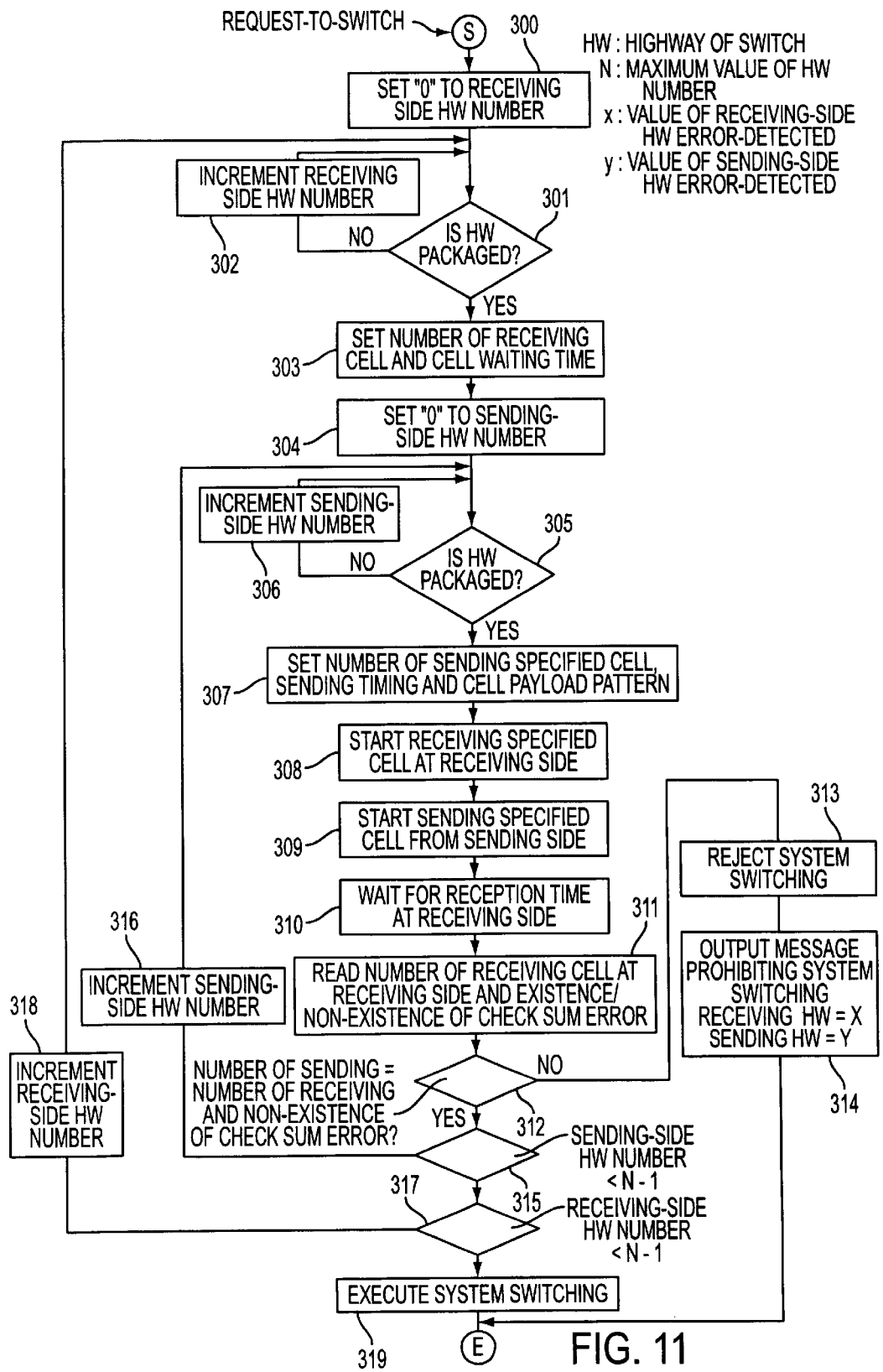
FIG. 11 is a flowchart executed for the system switching in the third embodiment.

FIG. 11 shows a flowchart of a processing routine realized by software installed. This processing routine starts in response to a request-to-switch supplied to the switching systems.

First, at Step 300, the number of a receiving-side highway is set to 0 (zero). Then whether a highway corresponding to the number is packaged or not is determined (Step 301). If being not packaged, the receiving-side highway number is incremented (Step 302), proceeding to the re-execution of Step 301. In contrast, at Step 301, if it is determined that the corresponding highway has been packaged, the processing proceeds to Step 303, at which the number of receiving cells and a cell-waiting time are set. Then, the number of a sending-side highway is set to 0 (zero) (Step 304), which is then followed by a process whether a highway having the corresponding highway number is packaged or not (Step 305). When such highway has not been packaged, the sending-side highway number is incremented (Step 306), repeating the process at Step 305. On one hand, when the state that the corresponding highway has been packaged recognized at Step 305, the processing is passed to Step 307, where the number of sending a specified cell, its sending timing, and a cell payload pattern are set.

Then, at Step 308, a command for the receiving side to start receiving a specified cell is sent out, and at Step 309, a command for the sending side to start sending a specified cell is sent out. Then, at Step 310, a waiting operation is continued for a period required to receive the cell at the receiving side, which is followed by Step 311 where the cell receiving number at the receiving side and the existence/non-existence of a check sum error are read.

At Step 312, in response to the read results, it is determined whether or not the cell sending number agrees with its receiving number and there is any check sum error. In the case that both the numbers of sending and receiving the cell do not agree with each other, or, there is a check sum error, the processing proceeds to Step 313, at which the request-to-switch for the systems is rejected. As a message disabling the systems from being switched, output are HW=X and HW=Y wherein X and denote error-detected receiving-side and sending-side highway numbers, respectively. After this output of the messages, the present routine ends.

At step 312, in case that the cell sending number agrees with its receiving number and there is no check sum error, the processing is passed to Step 315, where it is determined whether the sending-side highway number is less than its maximum "N−1" or not. When the sending-side highway number is less than its maximum "N−1", Step 316 is executed to increment the sending-side highway number, and Step 305 is then repeated. After having completed the determination to ask for the system switching for all the sending-side highways at Step 312, the processing proceeds to the next Step 317.

At Step 315, when the sending-side highway number is not less than its maximum "N−1", the processing also goes onto Step 317.

At Step 317, it is determined whether the receiving-side highway number is smaller than its maximum "N−1" or not. When the receiving-side highway number is less than its maximum "N−1," Step 318 is executed to increment the receiving-side highway number, and Step 301 is then repeated. After having completed the determination to ask for the system switching for all the sending-side highways at Step 312, the processing proceeds to the next Step 319.

At Step 319, the system switching is executed, and the routine then ends.

Therefore, the system switching is not executed which has a possibility of causing interruptions in ATM service, unless the normality in cell communication through the standby system is confirmed, thereby being able to continue the service through the act system.

For the sake of completeness it should be mentioned that the embodiments shown above are not a definitive list of possible embodiments. The expert will appreciate that it is possible to combine the various construction details or to supplement or modify them by measures known from the prior art without departing from the basic inventive principle.

What we claim is:

1. An ATM switching system including act-system and standby-system communication channels, a cell being sent through both the communication channels, comprising:
   a switch element for performing system switching from the act-system communication channel to the standby-system communication channel in response to a request-to-switch, said switch element connecting with a line concentrator;
   means for reading, when receiving the request-to switch, a number of the cell passing the line concentrator for each of the act-system and standby-system communication channels;
   means for calculating a difference between the read number of the passing cell in the act-system communication channel and the read number of the passing cell in the standby-system communication channel;
   means for allowing the switch element to perform the switching operation when the difference is less than a specified value; and
   means for prohibiting the switch element from the switching operation when the difference is not less than the specified value.

2. The ATM switching system of claim 1, wherein said reading means having an element reading the number of the passing cell every logic path (VPI/VCI) of the line concentrator for each of the act-system and standby-system communication channels.

3. An ATM switching system including act-system and standby-system communication channels, a cell being sent through both the communication channels, comprising;
   a switch element for performing system switching from the act-system communication channel to the standby-system communication channel in response to a request-to-switch, said switch element being connected between a first and second line concentrators;
   means for sending, when receiving the request-to-switch, a number of a specified cell from the first line concentrator placed in the standby-system communication channel to the second line concentrator in the standby-system communication channel; and
   means for controlling a switching operation of the switch element by allowing the switching operation when a number of a specified cell received at the second line concentrator in the standby-system communication channel and the number of the sent specified cell equal to each other and prohibiting the switching operation when the number of the specified cell received at the second line concentrator and the number of the sent specified cell differ from each other.

4. The ATM switching system of claim 3, wherein said specified-cell sending means includes an element storing checking data into the specified cell when sending the specified cell, and said switching controlling means include an element allowing the switching operation when the checking data in the specified cell received at the second line concentrator in the standby-system communication channel agrees with the checking data stored by the element and prohibiting the switching operation when the checking data in the specified cell received at the second line concentrator in the standby-system communication channel differs from the checking data stored by the element.

* * * * *

UNITED STATES PATENT AND TRADEMARK OFFICE
CERTIFICATE OF CORRECTION

PATENT NO. : 6,674,715 B1 Page 1 of 1
DATED : January 6, 2004
INVENTOR(S) : K. Yamada It is certified that error appears in the above-identified patent and that said Letters Patent is hereby corrected as shown below:

<u>Title page,</u>
Item [56], References Cited, FOREIGN PATENT DOCUMENTS, add the following:

-- 08-139726 (JP) May 31, 1996, NEC CORP --

Signed and Sealed this

Twentieth Day of April, 2004

JON W. DUDAS
*Acting Director of the United States Patent and Trademark Office*